Sept. 29, 1925.
F. B. COCKBURN
1,555,403
RELIEVING ATTACHMENT
Filed May 16, 1924
3 Sheets-Sheet 3
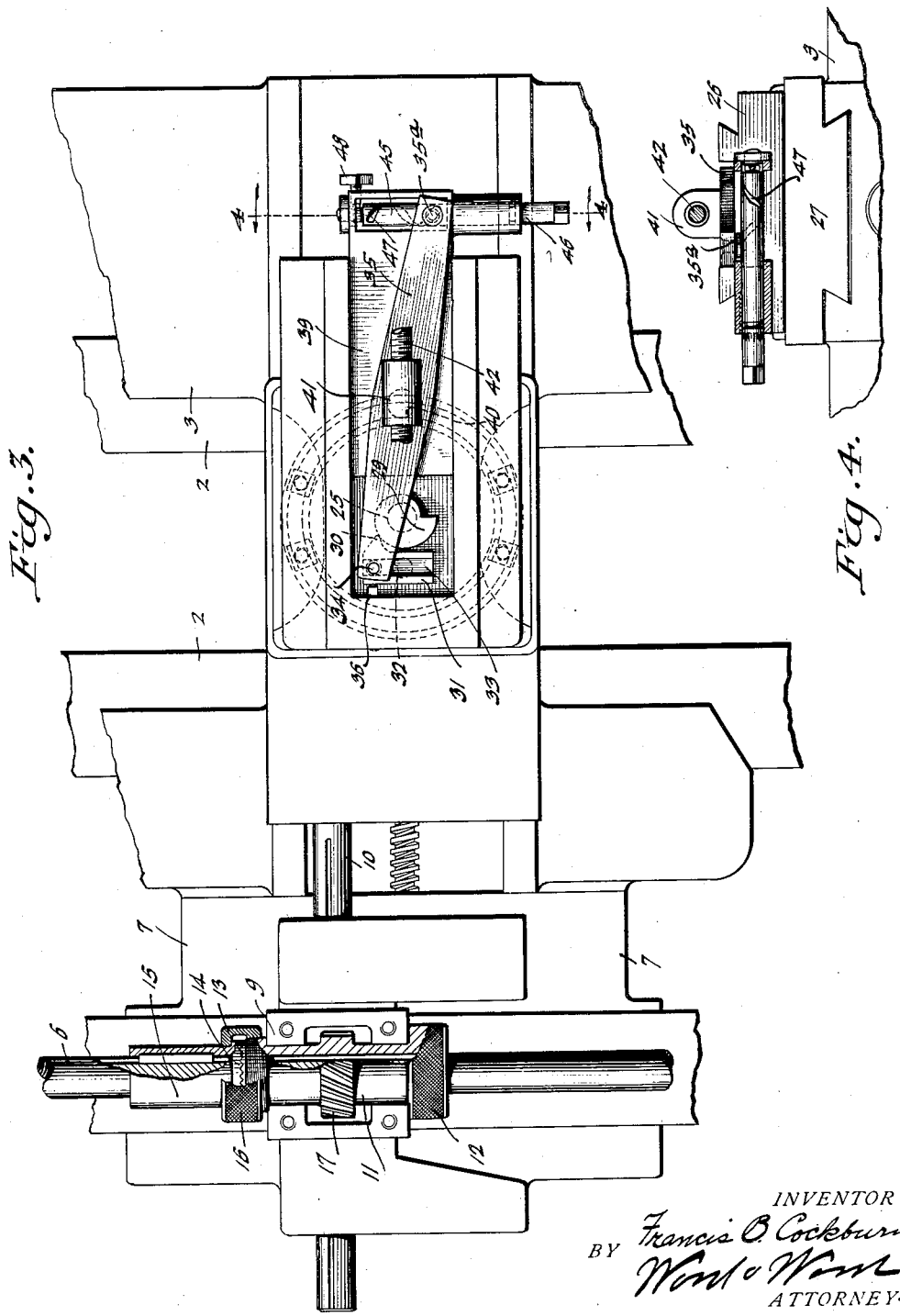
INVENTOR
Francis B Cockburn.
BY
ATTORNEYS Patented Sept. 29, 1925.

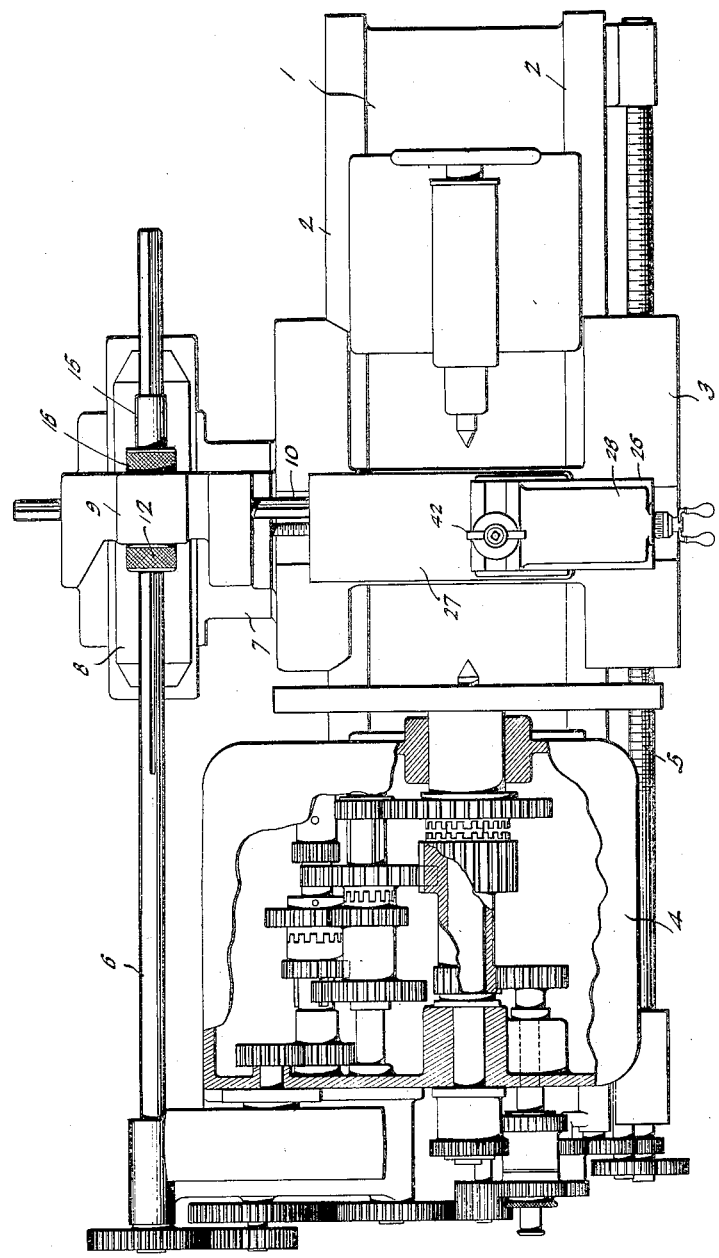

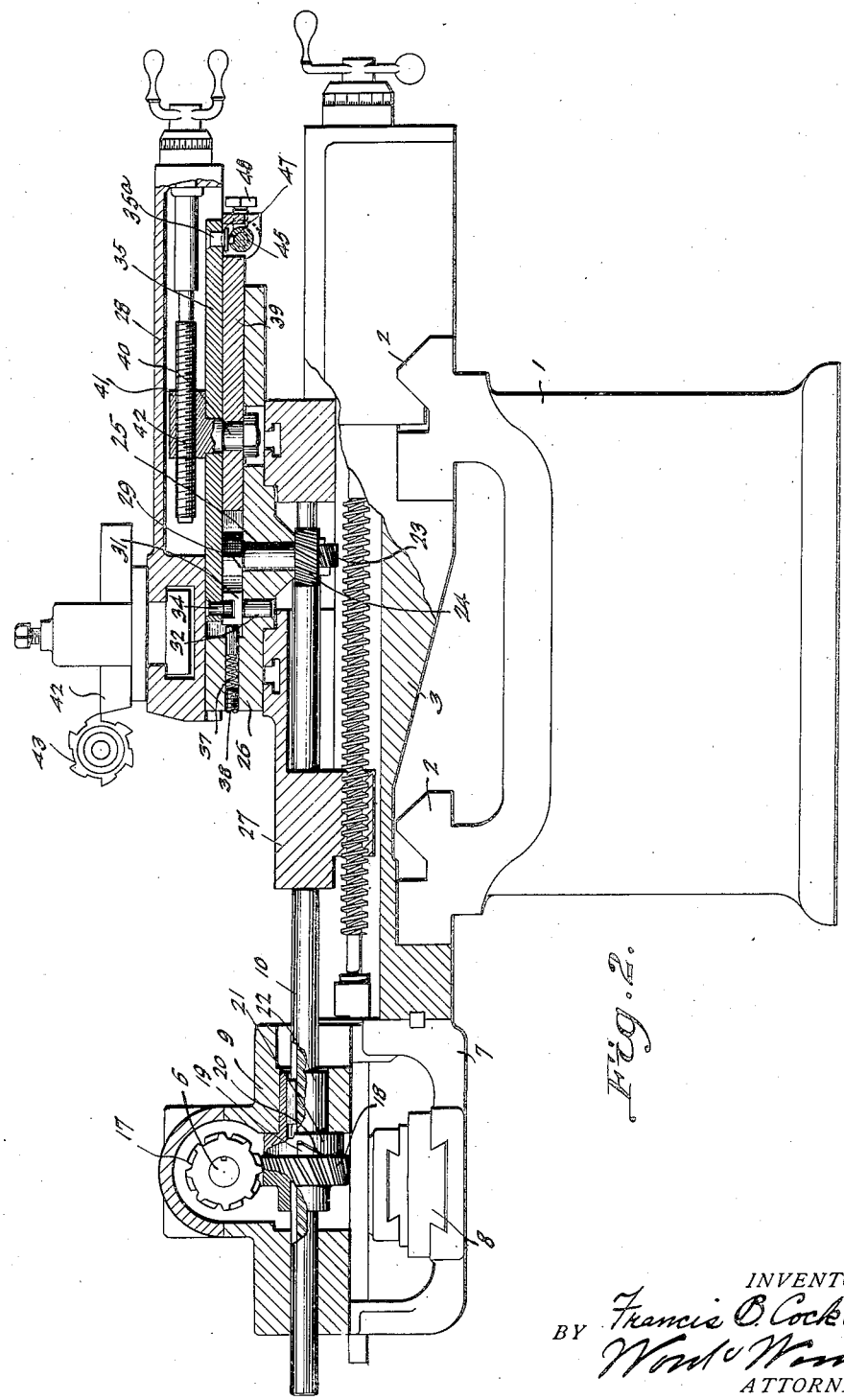

1,555,403

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

RELIEVING ATTACHMENT.

Application filed May 16, 1924. Serial No. 713,858.

*To all whom it may concern:*

Be it known that I, FRANCIS B. COCKBURN, a subject of the Kingdom of Great Britain, and residing at Cincinnati, in the county of Hamilton and State of Ohio, have invented a new and useful Relieving Attachment, of which the following specification is a full disclosure.

This invention relates generally to improvements in machine tools and particularly to a relieving attachment for lathes, the purpose of the attachment being for "backing off" or relieving hobs, taps, gear cutters, thread milling cutters, form cutters, dies, and other specially contoured work.

An object of the invention is to provide an attachment of this nature in which the reciprocating tool rest and slide may be adjusted at any angle relative to the work.

Another object is to provide a device with which the desired relief may be obtained, by means of a single throw cam, whereby the necessity of changing cams is avoided.

Another object is to provide a device wherein left hand taps may be relieved without change on the attachment. As now practiced it is necessary, when it is desired to relieve left hand taps, to form a pilot or shank on the front end of the tap so that this may be placed toward the headstock of the machine. It is necessary to remove this pilot or shank after relieving and as a result the center on which the tap has been turned is also removed, which is objectionable. In this attachment the left hand tap is placed in the machine in the same position as a right hand tap, the correct amount and direction of relief being obtained by adjustments in the attachment.

Another object of the invention is the provision of a graduated scale whereby the desired amount of relief from zero to the maximum capacity of the machine may be instantly obtained, the proper amount of relief being thus obtainable while the machine is in operation.

Another object is the provision of a relieving attachment which in no way affects the turning operation of the standard engine lathe, and in which the compound rest top slide is also the reciprocating slide when relieving, the slide being given a travel equal to the standard engine lathe so that by disconnecting the relieving drive, by means herein provided, the machine may be used as a standard engine lathe.

Another object is to provide means for registering the position of the work, when secured in a chuck or between centers, in proper relation to the reciprocation of the slide, that is, so that the tool will recede from the work when opposite the flute.

Another object is to provide means by which the rotation of the spindle may be reversed without correspondingly reversing the direction of the relieving mechanism. This is of particular advantage in relieving work in which the lead bears no relation to the lead of the lead screw of the lathe, and under which condition the half nuts cannot be disengaged from the lead screw to return the tool to the proper position for a subsequent cut, no reversal of the spindle being necessary herein.

Another feature of the invention is the provision of a ratchet coupling mechanism associated with meshing spiral gears, respectively carried by driving and driven shafts in such manner that the driving shaft when rotated in one direction will obtain a positive drive of the second shaft, and when rotated in the opposite direction will through the interaction of the spiral gears translate one of the gears and interrupt power to the second shaft.

Other objects and certain advantages and features will be disclosed in the description of the drawing forming a part of this application, in which drawing:

Figure 1 is a top plan view of an engine lathe containing my improved universal relieving attachment and illustrating the manner of connecting the headstock gearing with the relieving mechanism to obtain proper synchronism between work and tool.

Figure 2 is an enlarged section taken approximately on the line 2—2 of Figure 1.

Figure 3 is an enlarged top plan of the carriage with the tool slide removed for the purpose of disclosing the structural features of the slide reciprocating mechanism.

Figure 4 is a detail vertical section on line 4—4 of Figure 3, illustrating the micrometric throw adjusting means.

The bed of the lathe is indicated at 1 and is provided with the usual rails 2 upon which the carriage 3 is translatable. The headstock is indicated at 4 and contains the lathe spindle and transmission gearing for the spindle from which the feed shaft 5 for traversing the carriage 3 is driven. The headstock gearing may represent any type employed in the commercial or standard engine lathe, likewise the gearing or transmission mechanism connecting the spindle and lead screw or feed shaft for the carriage. The carriage feeding or translating mechanism and the tool slide feeding mechanism also may be of conventional form and as these elements of a lathe structure are well known in the art, no specific illustration or description is made herein, so that it is recognized that they are embodied in the lathe organization with which the present invention is incorporated.

The headstock gearing for the present invention also provides the transmission gearing for an auxiliary shaft, as a shaft 6 extending longitudinally of the lathe and at the rear side thereof for operating the relieving attachment applied to the lathe carriage. In this capacity it is permanently journaled upon the lathe bed in fixed bearing and does not have the disadvantage of flexible shaft connection usually employed upon lathes for operating relieving attachments. Under the arrangement shown the shaft 6 may be simultaneously rotated with the lead screw or shaft 5 through the main spindle as an intermediate or directly and rotated at a constant ratio with the rate of rotation of the spindle and at such a rate necessary for the contemplated use. A train of gearing as mounted upon the headstock end of the lathe is employed for positively connecting the shaft 6 with the headstock gearing. The number of gears are such as to obtain a definite speed transmission and range with the headstock gearing and relative rate of rotation of the spindle.

The carriage upon its rear end has rigidly attached thereto and extending rearwardly therefrom a bracket 7, providing a support for tool slide taper feeding mechanism 8 and for a journal bearing 9 movable with the carriage. This extension and bearing thereon is adapted for the support of the shaft 6 and for a shaft 10 rightangularly related to shaft 6 connecting said shaft 6 through suitable gearing with the compound rest upon the carriage 3. The shaft 6 is longitudinally splinegrooved and passes rotatably through a sleeve 11 rotatably journaled and supported in the bearing 9 but non-translatable therein. One end of the sleeve is knurled as at 12 and the other end has upon its end face radial clutch teeth 13. Each extremity of the sleeve is of enlarged diameter providing shoulders engageable with the sides of the bearing 9. The teeth 13 of the sleeve are engaged or engageable with corresponding teeth 14 of a sleeve 15 splined on the shaft 6, thus adapting said sleeve to be rotated by the shaft and to be slidable lengthwise thereon. The elements 11 and 15 are adapted to be locked together, when their teeth are engaged, by means of a peripherally knurled union nut 16 having threaded engagement with corresponding exterior threads upon the member 11.

In setting up the machine for a relieving operation it is necessary to time the movement of the tool with respect to the moving work so that the tool will recede from the work when the flute is opposite the tool. After the work is secured in the machine, and the proper gears selected according to the number of flutes, it may be found that when starting the machine the tool does not recede from the work when the flute is opposite the tool. To remedy this condition the lathe spindle is then rotated by hand until the back edge of the flute is in opposition to the cutting edge of the tool. The nut 16 is then loosened for disconnecting the transmission connection between the shafts 6 and 10, whereupon the sleeve 11 can be manually rotated in a forward direction until the compound rest top slide is properly set for a relieving operation.

The sleeve 11 is provided with a spiral gear 17 housed within the bearing 9 and in mesh with a companion gear 18 loosely mounted upon the cross shaft 10, which shaft is rotatably supported in the bearing 9 and in suitable bearings on the cross feed slide of the carriage. In order to enable the machine to be reversed without operating the relieving attachment the spiral gear 18 has a single ratchet tooth or projection 19 extending from one side thereof for engagement with a corresponding notch or tooth space 20 formed in the face side of the flange head 21 of a sleeve 22 splined on the cross shaft 10. This toothed or ratchet-like connection between the gear 17 and sleeve 22 is such as will obtain automatic connection and disconnection of the gear and sleeve to obtain positive driving connection between the gear and sleeve in one direction and to obtain disconnection of the relieving mechanism when the shaft 6 is rotated in reverse direction.

The spiral gear 18 is rotatable and slidable upon the driven shaft 10, its translative motion being limited by the housing, sufficiently to allow disengagement of its ratchet device, but at the same time maintaining driving connection with the spiral gear fixed to the driving shaft. With this driving connection maintained, the gear 18 will be thrown again to clutch position when the driving shaft 6 is rotated in forward direction. It will be noted that the action of the ratchet mechanism is obtained by the use of spiral gears one rotative with its shaft and the other rotatable and translatable upon its shaft, and with the reverse rotation of the driving shaft, in conjunction with the ratchet mechanism, acts to slide or translate the clutch or ratchet gear 18, withdrawing its projection 19 from the tooth of element 21, thus interrupting transmission of power to the driven shaft 10.

The inner end of the shaft 10 carries a spiral gear 23 engaged with a companion gear 24 on the lower end of a cam shaft or stud 25 journaled in the compound rest 26 revolubly supported or swivelled upon the tool carrying cross feed slide 27 of the carriage. The compound rest swivels about the axis of the shaft 25, adapting the rest to be adjusted angularly to any position to obtain corresponding adjustment of the tool holder 28 translatable upon the rest in the usual manner. A wiper cam 29 is fixed upon the upper end of the shaft 25, this cam being of the abruptly acting type and adapted to be rotated when shaft 10 is rotated. Adjacent the cam 29 and adapted to be engaged thereby is pivotally mounted a rock arm 31 as an oscillatable element, having a slot 33 in its upper face and having an extension 30 engageable with and by the cam. This element is pivoted in the swivelled bottom member 26 of the compound rest, and in this instance the axes of rotation of the oscillatable member and cam are aligned in a direction longitudinal of the cross slide. The upper surface of the member or compound rest 26 is recessed and translatably engaged within the recess is a block 39 connected by a pivot 40 with the tool holding slide 28, these two elements being thus attached for movement in unison. The pivot 40 has an enlarged head extending into the chambered portion of the tool carrier 28, this head portion having a threaded bore engaged by the threads of the hand feed screw 42 rotatably, non-translatably supported within the tool holder. By means of this connection the tool holder 28 can be adjusted with respect to the slide 39, and tool holder and slide move in unison. Pivoted upon the slide 39 about the stud 40 is a lever as a swingable element, having at one end and at one side of the stud 40 a downwardly projecting pin 34 engaged within the slot 33 of the oscillating element 31. This lever provides for adjusting or varying the stroke imparting motion of the rock arm. The rock arm 31 at one side of its pivot 32 is engaged by a spring pressed plunger 36 for urging and maintaining the toothed projection of the rock arm in engagement with the cam, and to provide power for obtaining a retreat stroke of the tool holder after forward reciprocation by the cam and rock arm. The plunger 36 is slidably mounted within the bore in the lower member 26 of the compound rest and has a spring 37 engaging its rear end and housed within the bore. An adjusting screw 38 has threaded connection with the bore for varying the tension of the spring.

When the cam 29 revolves in clockwise direction (see Figure 3) the rock arm 31 will be caused to oscillate and through its connection with the lever 35 will correspondingly oscillate the tool slide 28 and tool thereon toward and away from the work By changing the relation of the pin 34 with relation to the axis or pivot 32 the character of the movement of the tool with regard to the work can be varied. In the setting shown in Figure 3, the top slide will be positively propelled forwardly by the cam and retracted rapidly when the projection on the rocker arm drops off the high point of the cam, at which time the flute on the work is passing the tool point. The stroke of the tool support depends on the eccentricity of the axis of the pin 34 with respect to the axis 32 of the rock arm and thus the length and character of the stroke may be easily varied with accuracy and precision by adjustment of the pin 34 relative to the pivot 40. In order to accurately obtain this adjustment and to provide means whereby the adjustment can be made in a predetermined manner, an adjusting shaft 45 is rotatably mounted at the outer end of the slide 39 in suitable bearings, the shaft being rotatable but non-translatable within its bearings. This shaft is provided with a helical groove 47 engaged with which is a pin 35ª carried at the outer end of the lever 35. The shaft 45 outside its bearing is provided with graduations 46 registerable with a mark upon the outer face of the bearing. By rotating the shaft 45 in an appropriate direction the pin 34 may be adjusted in any degree with respect to the axis 32 at either side of the axis. An adjustable friction device 48, in the form of a screw, is engaged with the shaft 45 to prevent accidental turning after setting.

As shown in Figure 3 the mechanism is set for relieving right hand taps, milling cutters, etc. If an internal thread or left hand tap is to be relieved adjustment is made to bring the pin 34 at the opposite side of the center of oscillation of the element 31. In such a position the top slide will be retracted slowly and urged forwardly rapidly, which is the reverse of the action obtained with the pin in the position on the opposite side of the center. Means is thus provided in one instance for obtaining relatively slow movement of the tool toward and into the revolving work during a definite period and then rapidly withdrawing the same, and in another instance for rapidly moving the tool toward the work and then slowly withdrawing the same. The shift from one character of movement to the other can be made while the machine is in operation and with micrometric accuracy, to obtain varying degrees of movement of the tool.

This device also will provide means whereby the tool may be jumped by spring action toward the work and then positively withdrawn therefrom and whereby the tool may be positively advanced toward the work and withdrawn by backward jump under spring action. This permits of either left or right hand taps being relieved without reversing direction of rotation of the spindle, since, for a left hand tap the tool will be jumped quickly into the rear of the tap blade and then withdrawn slowly while relieving, leaving the tap blade at its cutting edge. In case of a right hand tap the tool will start at the cutting edge of the tap blade and slowly advance into the work and then snap back into cutting position opposite the cutting edge of the next blade. Reverse sequence of the cycle of the relieving tool so that positive movements take place while the tool is advancing instead of returning, or conversely, is obtained by adjusting the pin 34 relative to the axis of the member 31.

Adjusting the lever 35 to a central position locates the pin 34 concentric with the axis 32 of the oscillating member 31, thereby combining the plate 39 with the compound rest 26 for connecting said parts when the relieving mechanism is thrown out of commission and it is desired to feed the tool carrier manually by the feed screw 42.

In setting up the machine for the relieving operation, it is necessary to time the movement of the tool with respect to the moving work so that the tool will recede from the work when the flute is opposite the tool. In a case where the tool does not recede from the work when the flute is opposite the tool, the nut 16 is loosened and the sleeve 12 rotated in forward direction by hand until the rest top slide 28 is seen to drop back. This indicates that the projection 30 on the rock element 31 has just dropped off the high part of the cam 29. This drop back indicates that the correct relation between the work and the relieving attachment has been obtained and thereafter the sleeve 15 is clutched and secured to the element 11.

In relieving the work it is frequently necessary to reverse the machine instead of disengaging the half nuts from the lead screw to return the carriage for the second cut. Because of the abruptness of the cam "drop-off" it is impossible to reverse the cam in the compound rest. The ratchet arrangement, including the tooth 19 and cavity 20 is, therefore, provided. Because of the arrangement of the spiral gears 17 and 18 it will be seen that rotation in one direction will tend to force the gear 18 against the sleeve 22 in which case the gear and sleeve will remain clutched. Should the rotation of the shaft 6 be reversed, as will occur when the machine is reversed, the action of the gear on the shaft 6 will be to disengage the tooth 19 from its socket, as the result of which the shaft 10 will cease to rotate.

Inasmuch as the axis of swivel and the axis of rotation of the shaft 25 are concentric the rest can be moved to any angular position with reference to the work without affecting the operation of the relieving mechanism.

Having described my invention, what I claim is:

1. In a device of the class described, a support, a tool slide adapted to be reciprocated upon said support, a cam journaled in said support, an oscillatable member swivelled on said support actuated by said cam, and a lever connecting said slide and oscillatable member for reciprocating said slide through the swinging motion of said oscillatable member, said lever adapted to be adjustably connected with said member for varying the reciprocating strokes of said slide.

2. In a device of the class described, a support, a tool slide adapted to be reciprocated upon said support, a cam journaled in said support, an oscillatable member swivelled on said support and extending to opposite sides of its axis and at one end engaging said cam to be actuated thereby, a lever pivoted upon said slide, one end of the lever engaging with said oscillatable member for reciprocating said slide through the swinging motion of said oscillatable member, said lever adjustable upon said oscillatable member to opposite sides of its axis for varying the reciprocating strokes of said slide, and screw means carried by said slide connecting with the opposite end of said lever for adjusting said lever.

3. In a device of the class described, a translatable carriage, a cross feed slide translatable thereon, a compound tool rest swiveled upon said cross feed slide, a shaft rotatable in said tool rest, coaxial with the axis of rotation of the rest and having a cam and transmission element fixed thereto, a rock lever pivoted to said rest adjacent said cam and engageable thereby for rocking the lever, and having a groove in one face, an expansion element for urging said rocking lever against the cam, a slide upon said rest, a throw-adjusting lever pivoted to said slide, having a projection engaged within the slot of said rock lever adapting said slide and adjusting lever to be moved by said rock lever, a tool carrier slidable upon said compound rest connected for movement in unison with said slide and adjusting lever, and means for adjusting and setting said adjusting lever in micrometric degrees and visually registering the degree of such settings.

4. In a device of the class described, a translatable carriage, a cross feed slide translatable thereon, a compound tool rest swiveled upon said cross feed slide, a shaft rotatable in said tool rest, coaxial with the axis of rotation of the rest and having a cam fixed thereto, a rock lever pivoted to said rest adjacent said cam and engageable thereby for rocking the lever, an expansion element for urging said rocking lever against the cam, a slide upon said rest, an adjusting lever pivoted to said slide, having a projection slidably engaged with said rock lever adapting said slide and adjusting lever to be positively moved by said rock lever, and adapting said projections to be adjusted with respect to the axis of said rock lever, a tool carrier slidable upon said compound rest connected for movement in unison with said slide and adjusting lever, and means for setting said adjusting lever in micrometric degrees and visually registering the degree of such settings.

5. In a device of the class described, a cross feed slide, a compound rest thereon, comprising a lower member swiveled thereto and an upper tool-holding member translatable upon said lower member, a slide translatable intermediate said members and upon said lower member, a pivot attaching said slide and upper member for reciprocation in unison, an adjustable lever upon said slide, swingable about said pivot, and having projections at opposite sides of the pivot, an oscillatable element pivoted to said lower member, having a slot engaged by one of the projections of said adjustable lever, a rotatable shaft adjacent said oscillatable element coaxial with the swivel axis of said lower member and having a cam thereon, adapted for rocking said oscillatable element, and a shaft rotatable on said intermediate slide having a spiral groove engaged by the other projection of said adjustable lever, and having peripheral graduations registerable with a mark of said intermediate slide indicative of degrees of movement of the first mentioned projection with respect to the pivot of said oscillatable element.

6. In a device of the class described, a cross feed slide, a compound rest thereon, comprising a lower member swiveled thereto and an upper tool holding member translatable upon said lower member, a slide element translatable upon said lower member, a pivot attaching said slide and upper member for reciprocation in unison, a level upon said slide, swingable about said pivot and having projections at opposite sides of its pivot, an oscillatable element pivoted to said lower member, having a slot slidably engaged by one of the pins of said adjustable lever, a rotatable shaft coaxial with the swiveled axis of said lower member and having a cam thereon, adapted for rocking said oscillatable element, and a shaft rotatably mounted on said slide having a spiral groove engaged by the other projection of said adjustable lever, and having registerable peripheral graduations thereon indicative of degrees of movement of the first mentioned projection with respect to the pivot of said oscillatable element.

7. In a device of the class described, a carriage, a cross feed slide thereon, a tool rest swiveled to said cross feed slide, a tool slide translatable upon said rest, a shaft rotatable in said rest coaxial with the swivel of said rest, a cam at one end of said shaft, an oscillatable element adjacent said cam adapted to be rocked thereby, said element having a groove in one face, a spring pressed plunger engageable with said element at one side of its pivot for urging the element against the cam, a slide translatable in said rest, a lever pivoted to said slide having projections at relatively opposite sides of its pivot, one of said projections engaged with the groove of said oscillatable element, and the shaft journaled in said slide having a spiral groove engaged with the other projection of said lever and having peripheral graduations for indicating the degree of angular adjustment of said element with respect to the pivot of said oscillatable element.

8. In a device of the class described, a swiveled tool rest, a stud shaft rotatable therein coaxial with its axis of rotation and having an eccentric element at one end, an oscillatable element pivoted in said rest and adapted to be oscillated by said eccentric element, a slide translatable in said rest, a swingable element pivoted to said slide having a projection positively slidably engaged with said rock element, a translatable tool holder movable in unison with said slide and means for adjusting the projection of said swingable element with respect to the axis of said rock element in micrometric degree.

9. In a device of the class described, a swiveled compound tool rest, a stud shaft rotatable therein coaxial with its axis of rotation and having a wiper cam at one end, an oscillatable element pivoted in said rest adjacent said cam and adapted to be oscillated by said cam, a slide translatable in said rest, a swingable element pivoted to said slide having a projection slidably engaged with said rock element, a translatable tool holder upon said rest adjustable with respect to said slide and movable in unison with said slide, means for adjusting the projection of said swingable element with respect of the axis of said rock element in micrometric degree, and means for visually recording the adjustment.

10. In a device of the class described, a swiveled member, a shaft rotatable in said member coaxial with the rotative axis of the member, said shafts having an eccentric element thereon, a rock element having a groove in its upper face pivoted to said swiveled member and adapted to be rocked by said eccentric element, yieldable means for urging said rock element toward the eccentric element, a slide translatable in said member, a lever upon said slide attached thereon by a pivot, said lever having projections at opposite sides of its pivot, one engaged with the groove of said rock element, a tool support translatable upon said member in unison with said slide, and a shaft rotatably mounted upon said slide having a helical groove therein engaged by the second projection of said lever for micrometrically adjusting the first projection within the groove and with respect to the axis of said rock element.

11. In a device of the class described, a support, a member rotatably attached thereto, a shaft rotatable in said member coaxial with the rotative axis of the member, said shaft having a wiper cam thereon, a rocking element having a groove in one face pivoted to said member and adapted to be rocked by said cam, yieldable means for urging said rock element toward said cam, a slide translatable in said member, a lever upon said slide attached thereon by a pivot, said lever having pins at opposite sides of its pivot, one engaged with the groove of said rock element, a tool support translatable upon said member in unison with said slide, and means engaged with the other pin of said lever for micrometrically adjusting the opposite pin crosswise within the groove with respect to the axis of said rock element.

12. In a lathe, a spindle, spindle rotating mechanism, a translatable carriage, a member swiveled thereon, a tool carrier translatable upon said member, a shaft rotatable in said member coaxial with its swivel, transmission mechanism connecting said shaft and spindle rotating mechanism, a cam upon said shaft, a rock element adjacent said cam having a pivot rotatable in said member and grooved in one face, adapted to be rocked thereby, a spring engageable with said element at one side of its pivot for urging the element against the cam, a slide translatable in said member and movable with said tool carrier, a swinging element pivoted to said slide having projections at relatively opposite sides of its pivot, one of said projections slidably engaged within the groove of said rock element, and a shaft journaled in said slide having a helical groove engaged with the other projection of said element and having peripheral graduations thereon for registration with a mark on said slide, whereby varying degrees of adjustment between the pin of said swinging element with respect to the pivot of said oscillatable element are obtainable, and whereby the degree of adjustment is recorded.

13. In a lathe, headstock gearing, a spindle and lead screw transmittingly connected with said gearing, a carriage translatable by said lead screw, a member swiveled upon said carriage, a tool carrier translatable upon said member, a shaft rotatable in said member coaxial with its swivel, transmission mechanism between said shaft and headstock gearing for driving said shaft in one direction of rotation and for automatically disconnecting the drive in an opposite direction of rotation, a cam upon said shaft, a rock element adjacent said cam having a pivot rotatable in said member and grooved in one face, adapted to be locked thereby, a spring engageable with said element at one side of its pivot for urging the element against the cam, a slide translatable in said member and movable with said tool carrier, a swinging element pivoted to said slide having projections at relatively opposite sides of its pivot, one of said projections slidably engaged within the groove of said rock element, and a shaft journaled in said slide having a helical groove engaged with the other projection of said element and having peripheral graduations thereon for registration with a mark on said slide, whereby varying degrees of adjustment between the pin of said swinging element with respect to the pivot of said oscillatable element are obtainable, and whereby the degree of adjustment is recorded.

14. In a device of the class described, a translatable support, a sleeve rotatable thereon having a gear thereon and clutch teeth at one end, a shaft rotatable in said sleeve, a second sleeve splined to said shaft having teeth engaged with the teeth of said first sleeve, a collar for locking both sleeves to obtain rotation of said first sleeve with said shaft, and permitting said shaft to be rotated independently of said first sleeve when unlocked, a second gear in mesh with said first gear having a ratchet tooth projecting therefrom, a second shaft rotatable within said gear and translatable support, a ratchet sleeve splined to said second shaft having a notch adapted for engagement by said tooth for coupling gear and shaft in one direction of rotation and for automatically uncoupling the same in an opposite direction of rotation, a tool support swiveled to said carriage, a rotatable stub shaft coaxial with the axis of said support, said stub shaft transmittingly connected with said second shaft, having a cam rotatable therewith, a rock element adjacent said cam pivoted to said support and having a groove in one face, a slide in said rest reciprocable therein, a swinging element pivoted to said slide having a projection engaging the groove of said rock element, a tool carrier movable with said slide and adjustable with respect thereto, and means for micrometrically adjusting that projection of said swinging element within the groove, with respect to the axis of said rock element.

15. In a device of the class described, a work holding spindle, mechanism for operating said spindle, a shaft transmittingly connected with said spindle operating mechanism, a translatable carriage, a shaft rotatable in said carriage, a sleeve rotatable upon said shaft, and in said carriage, having clutch teeth thereon, exteriorly threaded adjacent said teeth and having a gear integral therewith, a clutch member splined to said shaft having teeth engageable with the teeth of said sleeve, a clamp for holding said sleeve and clutch member in clutched position, a second shaft rotatable in said carriage, a gear rotatable upon said shaft having a ratchet tooth projecting therefrom, transmittingly engaged with the other gear, a sleeve splined to said second shaft rotatable in said carriage and having a groove engageable by said tooth adapting said second shaft to be disconnected when rotation of said first shaft is reversed, a cross feed slide upon said carriage, a tool rest swiveled upon said cross feed slide, a shaft rotatable in said tool rest coaxial with the axis of rotation of the rest having an eccentric element fixed thereto, and in transmission connection with said second shaft, a rock lever having a groove in one face, pivoted to said rest and engageable by the eccentric element for rocking the lever, an expansion element for urging said rock lever against the cam, a slide upon said rest, an adjusting lever pivoted to said slide having a projection positively engaged within the slot of said rock lever adapting said slide and a lever to be moved by said lever, a tool holder upon said compound rest connected for movement with said slide, and means for setting and adjusting said lever in micrometric degree and recording such setting.

16. In a device of the class described, a spindle and mechanism for rotating said spindle, a shaft transmittingly connected with said spindle rotating mechanism, a translatable carriage, a shaft rotatable in said carriage, a sleeve rotatable upon said shaft, and in said carriage, having clutch teeth thereon, exteriorly threaded adjacent said teeth and having a spiral gear therein, a clutch member splined to said shaft having teeth engageable with the teeth of said sleeve, a detachable clamping element for holding sleeve and clutch member in clutched position, a second shaft rotatable in said carriage, a spiral gear rotatable upon said shaft having a ratchet tooth projecting therefrom and transmittingly engaged with the first mentioned spiral gear, a sleeve splined to said second shaft rotatable in said carriage, a ratchet means connecting said second spiral with its companion sleeve adapting said second shaft to be disconnected when rotation of said first shaft is reversed, a cross slide upon said carriage, a member swiveled upon said cross slide, a rock shaft rotatable in said member coaxial with the axis of rotation thereof, having a wiper cam fixed thereto, and in transmission connection with said second shaft, a rock lever pivoted to said member adjacent said cam, engageable thereby for rocking the lever, and having a groove in one face, means for forcing said rock lever against the cam, a slide upon said member, an adjusting setting lever pivoted to said slide having a projection engaged within the groove of said rock lever adapting said slide and a lever to be moved by said lever, and a reciprocable tool holder upon said member connected for movement with said slide.

17. In a device of the class described, a support, a tool slide adapted to be reciprocated upon said support, a cam journaled in said support, an oscillatable member swiveled on said support actuated by said cam, and a lever pivotally mounted upon said slide and extending longitudinally of the slide to the forward end thereof and connected at its rear end with said oscillatable member for reciprocating said slide through the swinging motion of said oscillatable member, and means at the forward end of said lever for adjusting its connection on said oscillatable member for varying the reciprocating strokes of said slide.

18. In a device of the class described, a driving shaft, a spiral gear fixed thereto, a driven shaft, a spiral gear rotatable and slidable thereon and meshed with said first mentioned gear, a sleeve keyed to said driven shaft, having ratchet engagement with said second spiral gear, whereby when said driving shaft is rotated in one direction, positive driving connection is maintained between the shafts, and whereby when said driving shaft is reversely rotated, said second spiral gear is translated upon the driven shaft and driving connection between the said second gear and sleeve is interrupted.

19. In a device of the class described, a support, a sleeve journalled thereon, a driving shaft traversing said sleeve and rotatable therein, means for connecting said sleeve for rotation with said shaft, a spiral gear on said sleeve, a driven shaft rotatable in said support, a spiral gear rotatable and translatable upon said driven shaft and meshed with said first mentioned gear, a sleeve keyed to said driven shaft and rotatable in said support, having a ratchet engagement with said second spiral gear, whereby when said driving shaft is rotated in one direction positive driving connection is maintained between the shafts, and whereby when said driving shaft is reversely rotated, said spiral gear is translated upon the driven shaft and driving connection between the said second gear and sleeve is interrupted.

20. In a device of the class described, a bearing casing, a driving shaft extending through said casing, a driven shaft journaled in said casing at right angles to said driving shaft, inter-meshing spiral gears respectively upon said shafts for transmittingly connecting the same, the relative tooth angle of said gears formed for sliding the gear upon said driven shaft in a direction corresponding to the direction of rotation of said driving shaft, and a clutch member fixed upon said driven shaft with which said spiral gear on said shaft cooperates for rotatably connecting said gear and shaft in one direction of gear rotation and disengaging the same therefrom in a reverse direction of gear rotation.

21. In a device of the class described, a driving shaft, a driven shaft, intermeshing gears respectively upon said shafts for transmittingly connecting the same, the relative tooth angle of said gears and their mountings upon their shafts providing for slidingly moving one of said gears slightly in alternate directions respectively and relative to the forward and reverse directions of rotation, and a clutch member with which said moving gear operates in one direction of gear rotation for connecting the gear to its shaft, and disconnecting the same in a reverse direction of rotation.

22. In a device of the class described, a driving shaft, a spiral gear slidably keyed on said shaft, a driven shaft, a second spiral gear loosely rotatable and slidable on said driven shaft, a member fixed on said driven shaft, said member and second spiral gear having a toothed engagement, the tooth angle of said gears being of a degree for moving and maintaining said second gear and member in engagement in one direction of driving shaft rotation and breaking the connection in a reverse direction of driving shaft rotation.

In witness whereof, I hereunto subscribe my name.

FRANCIS B. COCKBURN.